(12) United States Patent
Liang

(10) Patent No.: US 7,335,045 B1
(45) Date of Patent: Feb. 26, 2008

(54) CIRCUIT CARD LOCKING DEVICE AT A REAR COVER OF A COMPUTER

(75) Inventor: Chien-Fa Liang, Chung-Ho (TW)

(73) Assignee: Super Micro Computer, Inc., San Jose, CA (US)

( * ) Notice: Subject to any disclaimer, the term of this patent is extended or adjusted under 35 U.S.C. 154(b) by 0 days.

(21) Appl. No.: 11/501,020

(22) Filed: Aug. 9, 2006

(51) Int. Cl.
*H05K 5/00* (2006.01)

(52) U.S. Cl. ..................... 439/327; 361/801
(58) Field of Classification Search ............... 439/327, 439/372; 361/801, 759
See application file for complete search history.

(56) References Cited

U.S. PATENT DOCUMENTS 5,991,983 A * 11/1999 Kohler et al. ............... 24/594.1
6,287,138 B1 * 9/2001 Kuang ........................ 439/372
6,950,313 B1 * 9/2005 Shih ............................ 361/759
7,126,828 B2 * 10/2006 Beall et al. .................. 361/801

* cited by examiner

Primary Examiner—Neil Abrams
(74) Attorney, Agent, or Firm—Troxell Law Office, PLLC

(57) ABSTRACT

A circuit card locking device (30) at a rear cover of a computer, is composed of a computer casing (10), a rear side of which is connected with a rear cover (20) which is provided with a rectangular hole (22) and a projection piece (24) that is formed with a tab (241); a locking device (30), which tightly lock and fix a straight metallic piece (82) of a circuit card (80) at a periphery of the rectangular hole (22) of the rear cover (20). The locking device (30) has a body (3) that may be rotated from a retracted position in which it is securely held to a position in which an elastic tongue (35) of the body (3) presses on the metallic piece (82) of the circuit card (80) to urge it toward the projection piece (24) and to cause the tab (241) to lock into an indentation (821) in the metallic piece (82). Accordingly, the straight metallic piece (82) at a rear end of the circuit card (80) can be tightly locked on the rear cover (20) without using screws, and can be quickly released from the rear cover (20).

6 Claims, 8 Drawing Sheets

CIRCUIT CARD LOCKING DEVICE AT A REAR COVER OF A COMPUTER

BACKGROUND OF THE INVENTION (a) Field of the Invention

The present invention relates to a circuit card locking device at a rear cover of a computer, and more particularly to a rear cover with a locking device which can lock and fix a metallic piece at a rear side of a circuit card.

(b) Description of the Prior Art

It is known that a conventional circuit card is always fixed on a rear cover of a computer casing with screws; therefore, when the circuit card is to be assembled on or disassembled from the rear cover, the screws should always be locked or unlocked, which is very time-consuming in operation.

SUMMARY OF THE INVENTION

The primary object of present invention is to provide a circuit card locking at a rear cover of a computer, such that a straight metallic piece at a rear end of the circuit card can be tightly locked on the rear cover without using screws, and can be quickly released from the rear cover.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
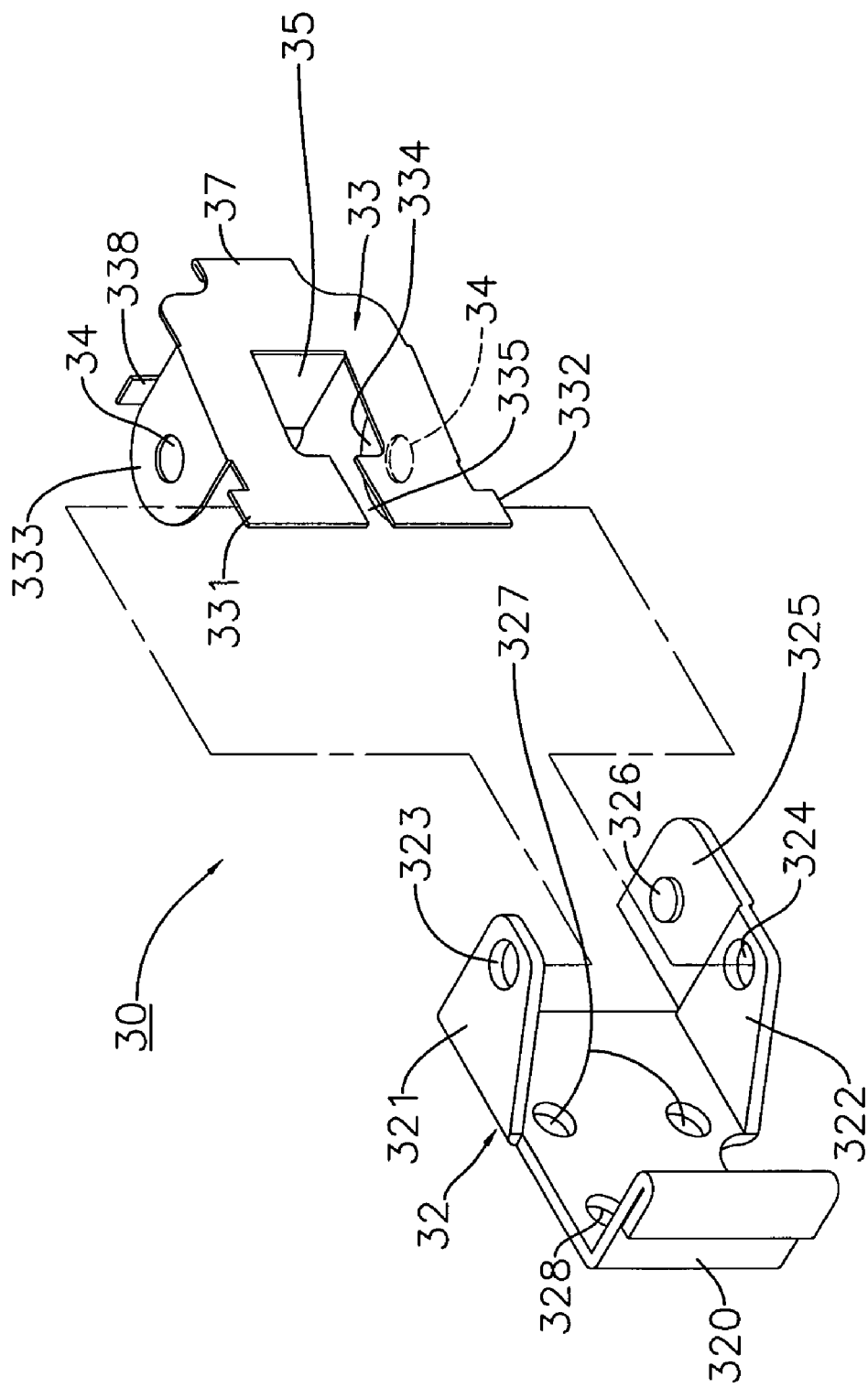
FIG. 1 shows an exploded view of parts of a locking device of the present invention.
Figure 2:
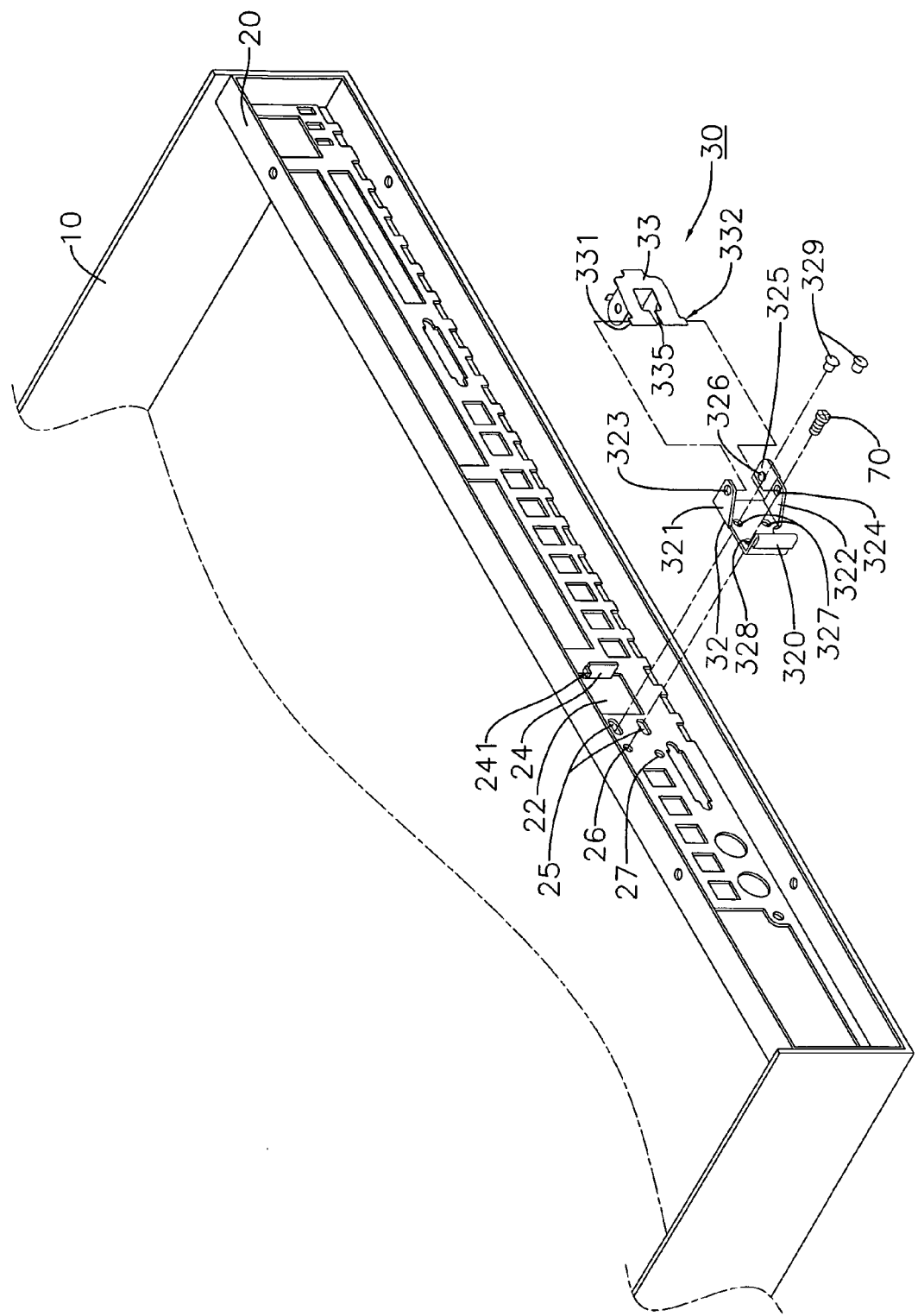
FIG. 2 shows an exploded view of a locking device after being fixed on a rear cover of the present invention.
Figure 3:
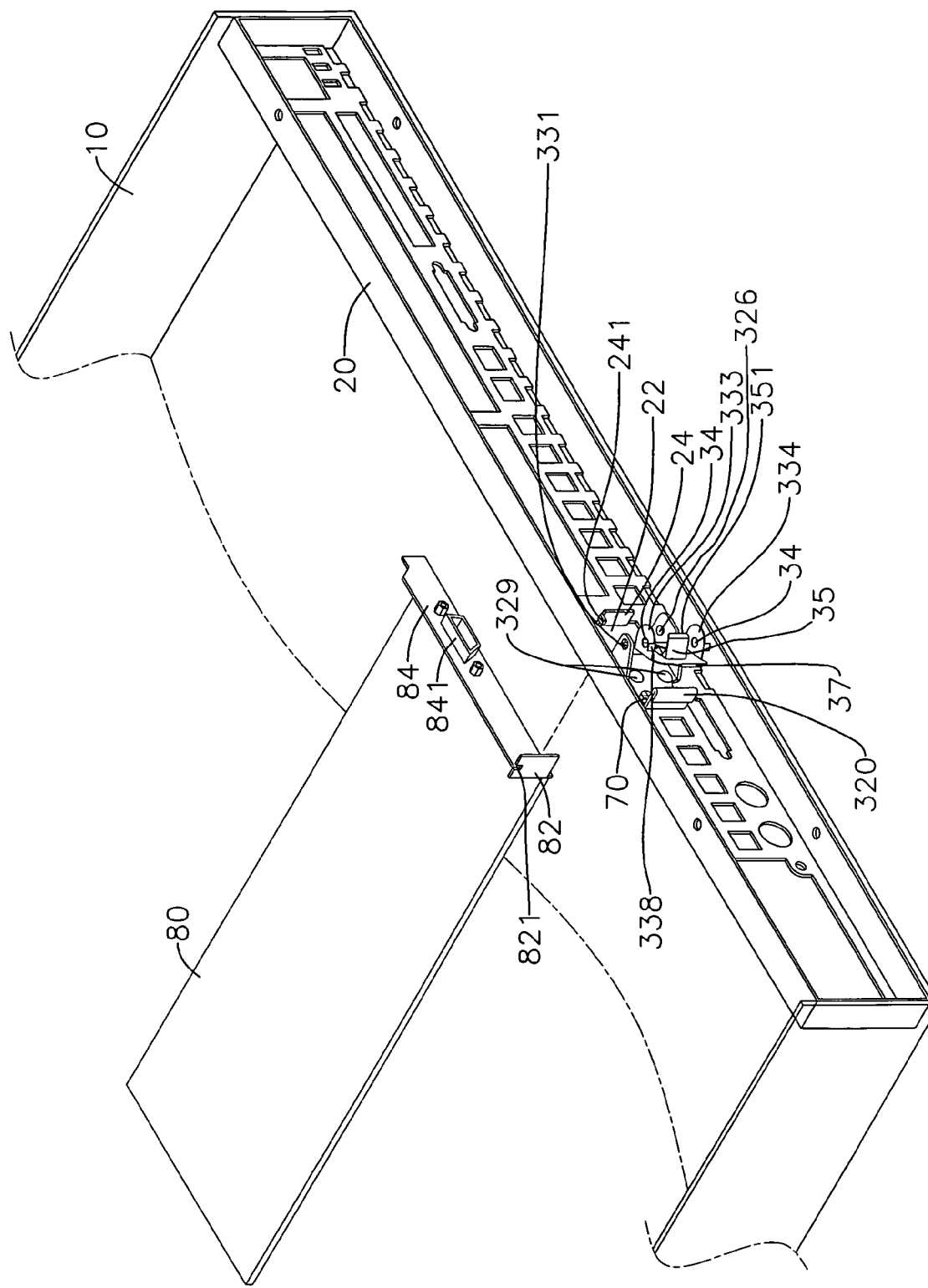
FIG. 3 shows an exploded view of a circuit card and a locking device of the present invention.

Referring to FIGS. 1 to 3, the present invention is to provide a circuit card locking device at a rear cover of a computer, including a computer casing 10, a rear side of which is connected to a rear cover 20, with a wall of the rear cover 20 being provided with a rectangular hole 22 having an outward projection piece 24 at a side edge thereof; and a locking device 30.

The locking device 30 is composed of a seat 32, which is fixed on a board at a side of the rectangular hole 22, and an upper and lower parts of a body of which are provided with an upper ear 321 and a lower ear 3211 respectively, with the upper and lower ears 321, 322 being provided with an upper and lower through-holes 323, 324; a locking body 33, an upper and lower parts at a rear end of which are protruded with an upper projection end 331 and a lower projection end 322 respectively, with the upper and lower projection ends 331, 332 being loosely connected into the upper and lower through-holes 323, 324 respectively, and with an elastic locking piece 35 being extended outward from a bottom wall of the locking body 33 vertically, such that the locking body 33 can be rotated on the seat 32 using the upper and lower projection ends 331, 332 as axes.

Referring to FIG. 3, the upper and lower edges of the locking body 33 are provided respectively with the horizontal upper ear 333 and lower ear 334 which are formed respectively with positioning holes 34. The lower ear of the seat 32 is extended outward with the projection piece 325, and an upper surface of which is provided with a projection body 326 which can be locked and positioned into the positioning hole 34 below the locking body 33.

Figure 7:
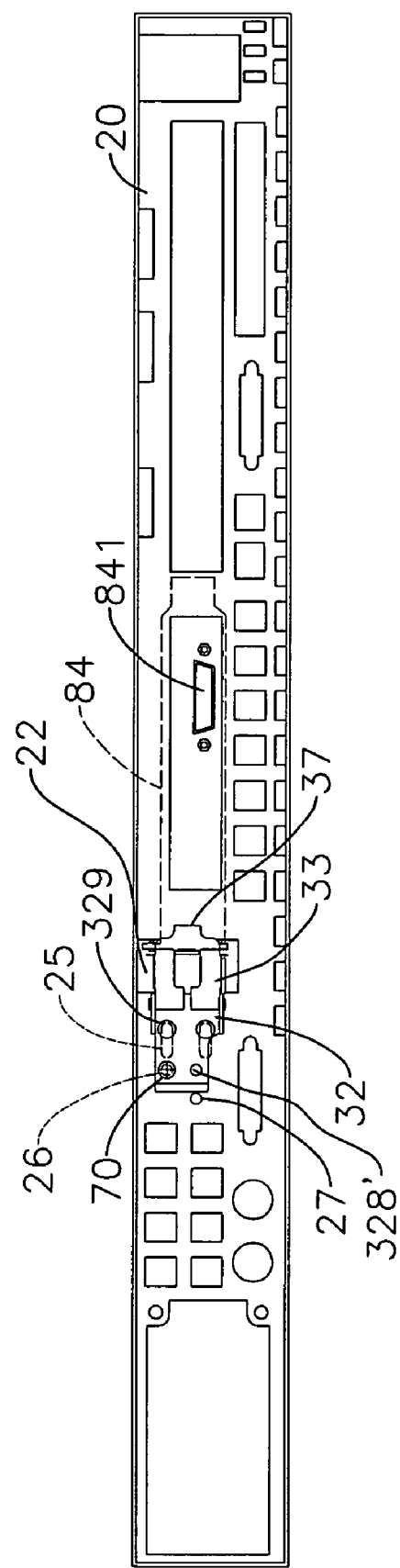
FIG. 7 shows a rear view of a rear cover of the present invention, which is assembled with a locking device.

Referring to FIG. 2, a wall at the other side of the rectangular hole 22 is provided with at least more than one long hole 25, a rear side wall of which is provided with a plurality of screw holes 26, 27 at different distances. A base plate of the seat 32 is provided with a plurality of through-holes 327, screw holes 328, and lower screw holes 328' (as shown in FIG. 7), wherein the through-holes 327 are riveted with a fixing pin 329 respectively, and a bolt 70 can be screwed into the screw hole 328, and a screw hole 26 on the rear cover 20, such that the seat 32 can be fixed on the rear cover 20.

The rectangular hole 22 is transfixed and locked by a metallic piece 82 at a side of a circuit card 80, and the straight metallic piece 82 is provided with an indentation 821 (as shown in FIG. 3).

Figure 4:
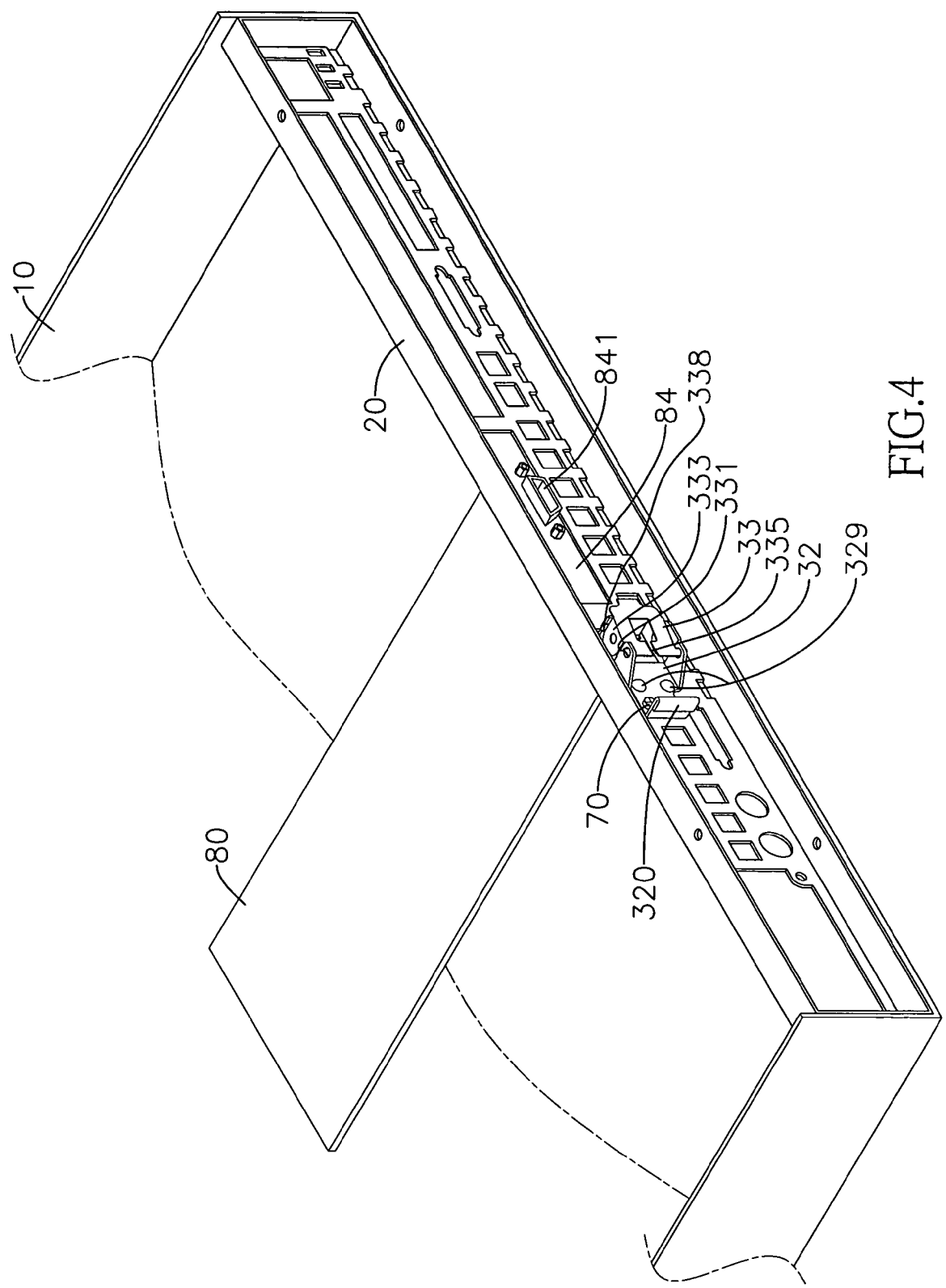
FIG. 4 shows a perspective view of a circuit card and a locking device of the present invention, which are assembled together.

An upper end of the projection piece 24 is provided with a horizontal projection end 241 which is locked into the indentation 821, and the metallic piece 82 is tightly abutted on a side surface of the projection piece 24. In addition, the locking piece 35 can be abutted on a side surface of the metallic piece 82 to fix the metallic piece 82 on the projection piece 24 (as shown in FIG. 4).

Figure 6:
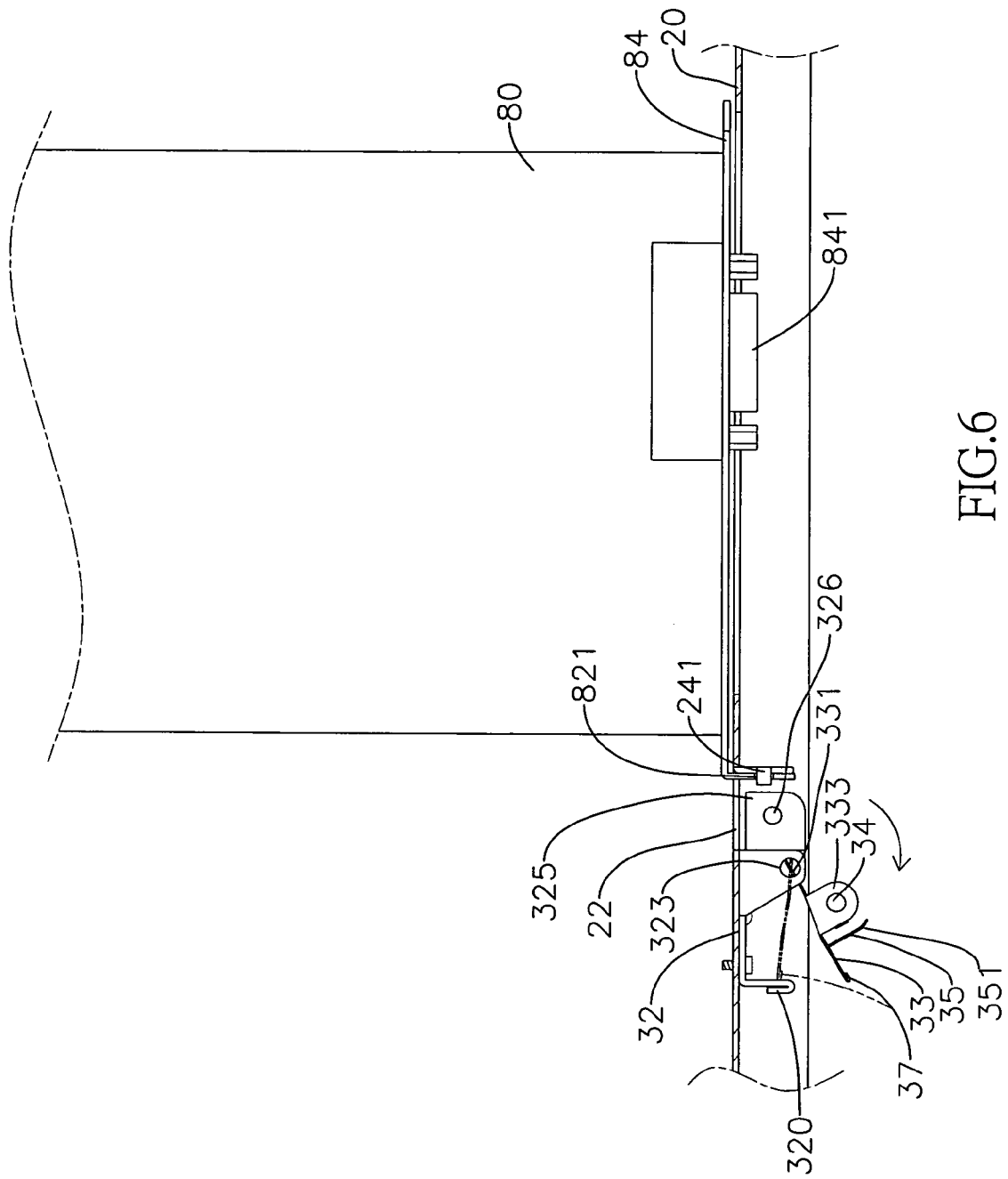
FIG. 6 shows a cross sectional view of a circuit card of the present invention, which is not locked.

An exterior end of the locking body 33 is provided with a projection piece 37 for lifting. A rear side end of the seat 32 is provided with a projected wall body 320, and when the projection piece 37 is rotated to a rear dead point, it can be abutted on an inner wall of the projected wall body 320 (as shown in FIG. 6).

A main wall of the locking body 33 is provided with a through-slot 335 (as shown in FIG. 1).

A side edge of the upper ear 333 on the locking body 33 is provided with a vertical projection piece 338 (as shown in FIG. 1).

Figure 5:
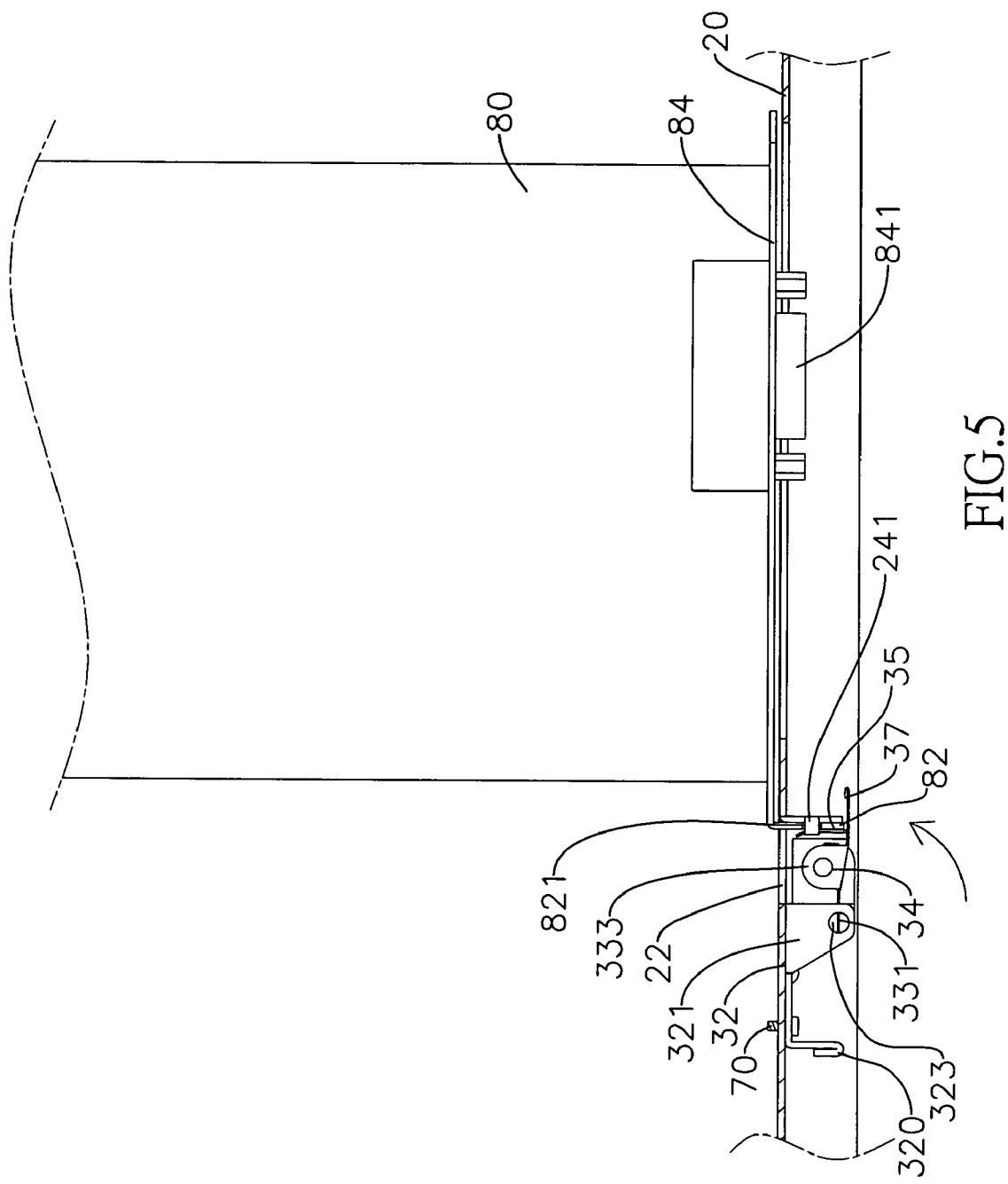
FIG. 5 shows a cross sectional view of a circuit card of the present invention, which is locked and positioned.

Referring to FIG. 3, a circuit card 10 is a normalized circuit board product, and a rear side edge of the circuit card 10 is connected with a metallic piece 82. A side of the metallic piece 82 is extended along a Y-axis to be connected with a rear board 84 which is made by a metal and is connected with a connection port 841. By transfixing the straight metallic piece 82 into a rectangular hole 22 to be abutted on a surface of a projection piece 24, and locking an indentation 821 into a projection end 241, a user can use finger to lift a projection piece 37 to rotate an upper and lower projection ends 331, 332 of a locking body 33 in an upper and lower through-holes 323, 324 (as shown in FIG. 5 and FIG. 6). A locking piece 35 is a piece of elastic member, and a tilt slope 351 at a front end of which is first frictionally contacted with and abutted on a wall of the metallic piece 82, thereby causing the locking piece 35 to be elastically deformed. Referring to FIG. 4 and FIG. 5, when the locking body 33 is rotated clockwise to an inner dead point, a vertical projection piece 338 will be abutted on the projection end 241, in order to prevent from the locking body 33 to be excessively rotated. The locking piece 35 is then abutted on the metallic piece 82, such that the metallic piece 82 of the circuit card 80 can be tightened and positioned. At this time, a positioning hole 34 will be locked with a projection body 326, such that when the locking body 33 is in a locking state, it will not be displaced freely.

Referring to FIG. 6, when an operator uses finger to lift the projection piece 37 outward, a lower eat 334 will be elastically deformed (that is, displaced upward a little) when it is subjected to an external force, due to a design of through-slot 335 (as shown in FIG. 1). Therefore, the positioning hole 34 will be moved upward to leave the projection body 326. Similarly, when the upper and lower projection ends 331, 332 are rotated counterclockwise in upper and lower through-holes 323, 324, the locking body 32 will be rotated outward, and the locking piece 35 will be elastically deformed. After it is removed from the metallic piece 82, the locking piece 35 will be elastically restored. Therefore, the locking body 33 is in an open state on the seat 32, and a tightening state of the metallic piece 82 of the circuit card 82 disappears. In addition, the projection piece 37 can be abutted on an inner wall of a projected wall body 320, such that when the locking body 33 is in the open state, it will not move freely.

Figure 8:
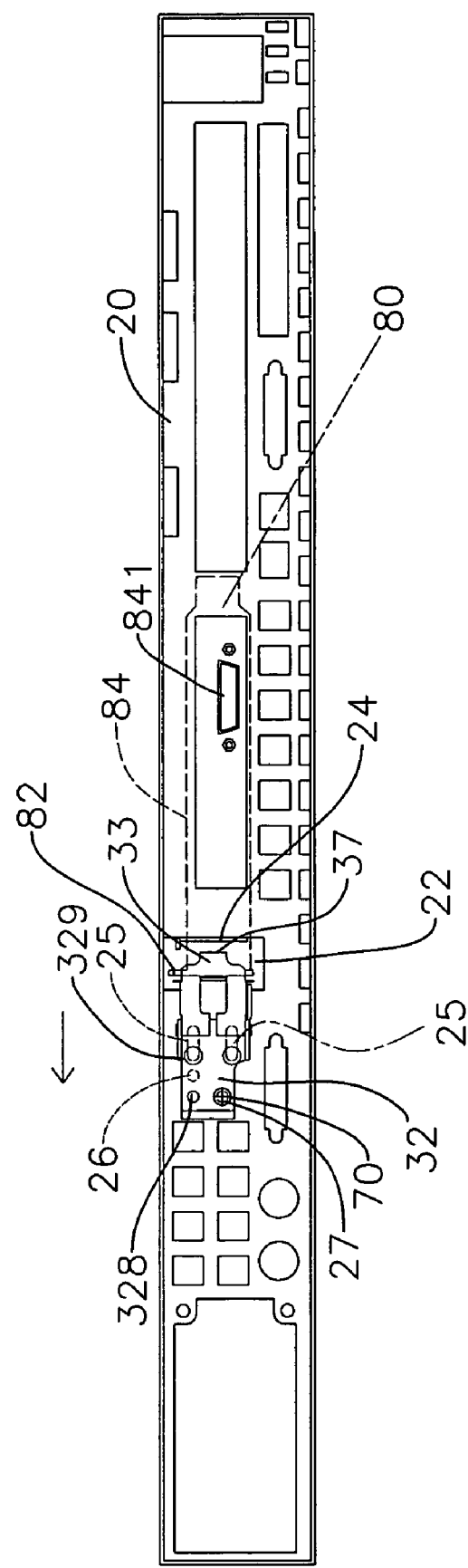
FIG. 8 shows a rear view of another embodiment of a rear cover of the present invention, which is assembled with a locking device.

Referring to FIG. 3 and FIG. 7, as an entire length of the rear board 84 of the ordinary circuit card 80 is a constant value, a bolt 70 is screwed into a screw hole 328 of the seat 32, and a first screw hole 26 on a rear cover 20. However, if the length of rear board 84 of the circuit board 80 is longer, as shown in FIG. 7 and FIG. 8, the bolt 70 will be screwed into a lower screw hole 328' of the seat 32, and a second screw hole 27 on the rear cover 20. Therefore, the locking piece 35 can be still abutted on the vertical metallic piece 82, such that the metallic piece 82 cannot move. Yet, at this time, the metallic piece 82 is not abutted on a surface of a projection piece 24. Accordingly, even the rear board 82 is provided with different specifications of length, by a design of two screw holes 26, 27 at different distances, a design of screw hole 328 at a different distance, and a screwing of the lower screw hole 328' with an adjustable distance, the metallic piece 82 can be locked and tightened. On the other hand, a design of two long holes 25 is to enable the fixing pins 329 to be displaced in the long holes 25, which means that when the seat 32 is displaced left (as shown in FIG. 7 and FIG. 8), the two fixing pins 329 can be displaced in the long holes 25.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A circuit card locking device at a rear cover of a computer, comprising a computer casing, a rear side of which is connected with a rear cover, with a wall of the rear cover being provided with a rectangular hole having an outward projection piece at an edge thereof, wherein a wall at another edge of the rectangular hole is provided with at least one long hole, a rear wall of the long hole is provided with a plurality of screw holes at different distances, a base plate of the seat is provided with a plurality of through-holes, screw holes, and lower screw holes, with the through-holes being riveted with a fixing pin respectively, and a bolt being screwed into both one of the screw holes on the base plate and the screw hole on the rear cover, such that the seat is fixed on the rear cover; and a locking device; the locking device including a seat, which is fixed on a board at a side of the rectangular hole, upper and lower parts of a body of which are protruded respectively with an upper ear and a lower ear having an upper and lower through-holes; and a locking body, upper and lower parts of a rear end of which are protruded respectively with an upper projection end and a lower projection end which are loosely connected into the upper and lower through-holes respectively, with an elastic locking piece being extended outward from a bottom wall of the locking body vertically to press on a straight metallic piece of a circuit card, and with the locking body being able to be rotated on the seat using the upper and lower projection ends as axes.

2. The circuit card locking device at a rear cover of a computer according to claim 1, wherein an upper and lower edges of the locking body are provided with a horizontal upper ear and lower ear respectively, and the upper and lower ears are provided with positioning holes respectively; the lower ear of the seat being extended outward with a projection piece, with an upper surface of the projection piece being provided with a projected body; a positioning hole of the lower ear below the locking body providing locking and positioning functions for the projection body.

3. The circuit card locking device at a rear cover of a computer according to claim 2, wherein an exterior end of the locking body is provided with a liftable projection piece for lifting, a rear side end of the seat is provided with a projected wall body, and the projection piece can be abutted on an inner wall of the projected wall body after the projection piece is rotated, along with the locking body, to a rear dead point.

4. The circuit card locking device at a rear cover of a computer according to claim 1, wherein the rectangular hole is transfixed and locked by the straight metallic piece at a side of the circuit card, the straight metallic piece is provided with an indentation, an upper end of the projection piece is provided with a horizontal projection end, the projection end is locked into the indentation, and the metallic piece is abutted on a side surface of the projection piece; the locking piece being able to be abutted on a side surface of the metallic piece, to fix the metallic piece on the projection piece.

5. The circuit card locking device at a rear cover of a computer according to claim 1, wherein a main wall of the locking body is provided with a through-slot between the upper projection end and the lower projection end.

6. The circuit card locking device at a rear cover of a computer according to claim 1, wherein a side edge of the upper ear on the locking body is provided with a vertical projection piece.

* * * * *